(12) United States Patent
Kaku

(10) Patent No.: US 12,060,079 B2
(45) Date of Patent: Aug. 13, 2024

(54) AUTONOMOUS DRIVING REQUIREMENTS DEFICIENCY DETERMINATION

(71) Applicant: Toyota Research Institute, Inc., Los Altos, CA (US)

(72) Inventor: Shunsho Kaku, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 43 days.

(21) Appl. No.: 16/872,604

(22) Filed: May 12, 2020

(65) Prior Publication Data

US 2021/0354728 A1 Nov. 18, 2021

(51) Int. Cl.
*B60W 60/00* (2020.01)
*B60W 50/029* (2012.01)
*G05D 1/00* (2024.01)
*G07C 5/00* (2006.01)

(52) U.S. Cl.
CPC ..... *B60W 60/00184* (2020.02); *G05D 1/0055* (2013.01); *G05D 1/0221* (2013.01); *G07C 5/008* (2013.01); *B60W 2050/0297* (2013.01)

(58) Field of Classification Search
CPC .... B60W 60/00184; B60W 2050/0297; G05D 1/0055; G05D 1/0221; G07C 5/008
See application file for complete search history.

(56) References Cited

U.S. PATENT DOCUMENTS

| 10,295,363 | B1 | 5/2019 | Konrardy et al. | |
| 10,386,192 | B1 | 8/2019 | Konrardy et al. | |
| 2015/0241878 | A1* | 8/2015 | Crombez | B60W 30/12 701/23 |
| 2016/0229414 | A1* | 8/2016 | Desnoyer | B60W 50/14 |
| 2017/0356747 | A1* | 12/2017 | Iagnemma | G01C 21/3461 |
| 2018/0025317 | A1 | 1/2018 | Dominguez | |
| 2018/0061226 | A1* | 3/2018 | Thelen | G08G 1/0112 |
| 2018/0113474 | A1* | 4/2018 | Koda | G05D 1/0274 |
| 2018/0266833 | A1 | 9/2018 | Carlson et al. | |
| 2020/0174470 | A1* | 6/2020 | Park | B60W 60/0053 |
| 2020/0317216 | A1* | 10/2020 | Konrardy | B60W 30/182 |
| 2021/0027622 | A1* | 1/2021 | Jiao | G06Q 20/10 |
| 2022/0332348 | A1* | 10/2022 | Liu | B60W 40/02 |

* cited by examiner

Primary Examiner — Rachid Bendidi
Assistant Examiner — Selena M Jin
(74) Attorney, Agent, or Firm — Christopher G. Darrow; Darrow Mustafa PC

(57) ABSTRACT

Systems, methods, and other embodiments described herein relate to resolving one or more deficiencies in autonomous driving requirements for a road segment. In one embodiment, a method includes receiving sensor data for a portion of the road segment from at least one sensor of a vehicle, and determining autonomous driving requirements for the portion of the road segment. The method includes identifying the one or more deficiencies in the autonomous driving requirements for the portion of the road segment based on the received sensor data and the determined autonomous driving requirements for the portion of the road segment. The method includes determining an alteration to the portion of the road segment to overcome the one or more deficiencies in the autonomous driving requirements for the portion of the road segment.

17 Claims, 9 Drawing Sheets

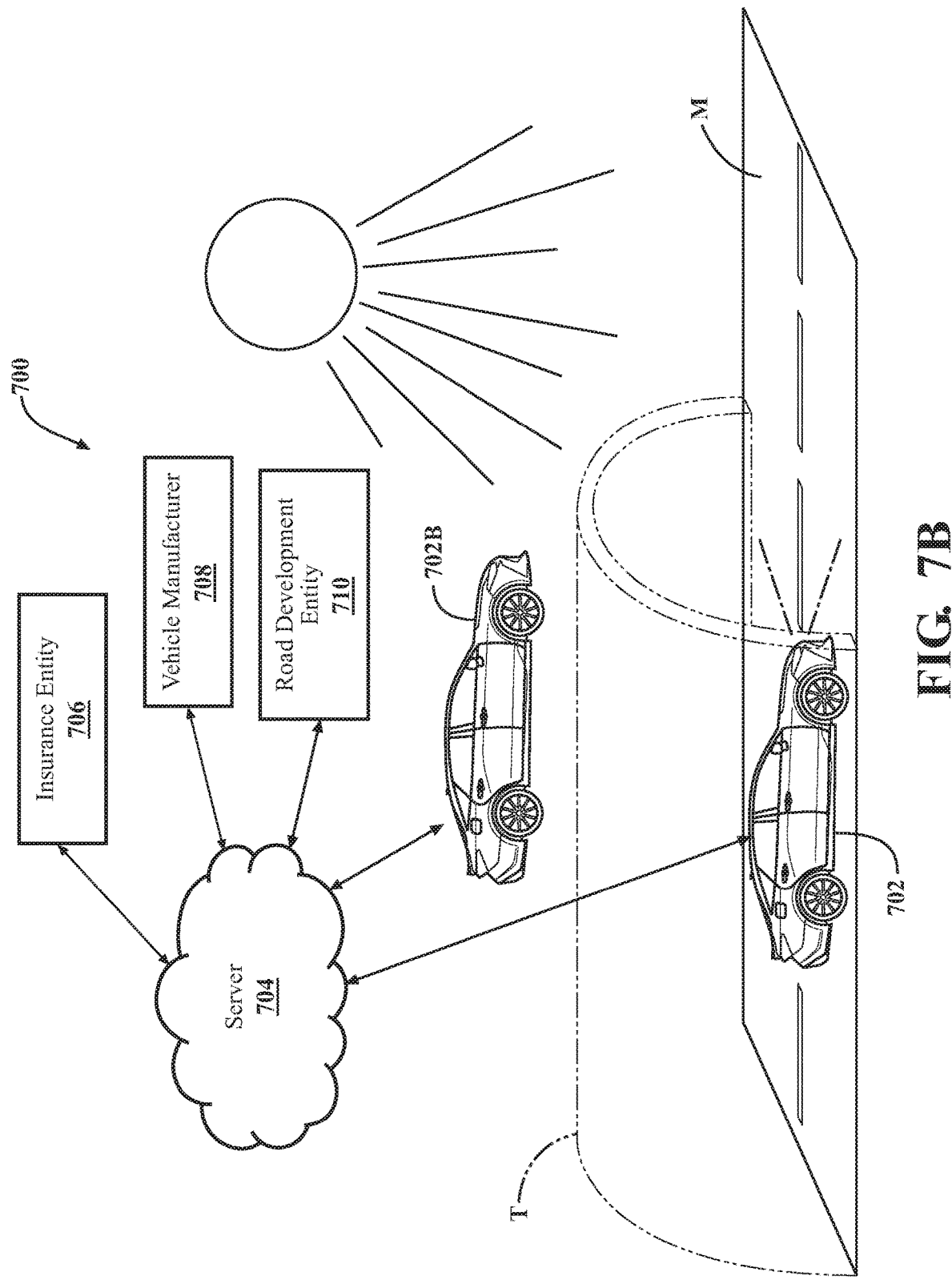

AUTONOMOUS DRIVING REQUIREMENTS DEFICIENCY DETERMINATION

TECHNICAL FIELD

The subject matter described herein relates, in general, to systems and methods for resolving one or more deficiencies in autonomous driving requirements for a road segment.

BACKGROUND

Modern vehicles include one or more sensors that detect and relay information about the environment in which the vehicle is travelling. Some vehicles may require aids such as lane markers in the environment to determine how to operate the vehicle within the environment. In an environment lacking such aids, the sensors may be unable to detect information about the environment. Without the information about the environment, the vehicle may be incapable of determining how to operate the vehicle within that environment, making the environment unsuitable for autonomous and/or semi-autonomous driving.

SUMMARY

In one embodiment, a system for resolving one or more deficiencies in autonomous driving requirements for a road segment is disclosed. The system includes one or more processors, and a memory in communication with the one or more processors. The memory stores a data acquisition module including instructions that when executed by the one or more processors cause the one or more processors to receive sensor data for a portion of the road segment from at least one sensor of a vehicle. The memory stores a deficiency resolution module including instructions that when executed by the one or more processors cause the one or more processors to determine autonomous driving requirements for the portion of the road segment, identify the one or more deficiencies in the autonomous driving requirements for the portion of the road segment based on the received sensor data and the determined autonomous driving requirements for the portion of the road segment, and determine an alteration to the portion of the road segment to overcome the one or more deficiencies in the autonomous driving requirements for the portion of the road segment.

In another embodiment, a method for resolving one or more deficiencies in autonomous driving requirements for a road segment is disclosed. The method includes receiving sensor data for a portion of the road segment from at least one sensor of a vehicle, and determining autonomous driving requirements for the portion of the road segment. The method also includes identifying the one or more deficiencies in the autonomous driving requirements for the portion of the road segment based on the received sensor data and the determined autonomous driving requirements for the portion of the road segment. The method includes determining an alteration to the portion of the road segment to overcome the one or more deficiencies in the autonomous driving requirements for the portion of the road segment.

In another embodiment, a non-transitory computer-readable medium for resolving one or more deficiencies in autonomous driving requirements for a road segment and including instructions that when executed by one or more processors cause the one or more processors to perform one or more functions, is disclosed. The instructions include instructions to receive sensor data for a portion of the road segment from at least one sensor of a vehicle, and determine autonomous driving requirements for the portion of the road segment. The instructions further include instructions to identify the one or more deficiencies in the autonomous driving requirements for the portion of the road segment based on the received sensor data and the determined autonomous driving requirements for the portion of the road segment. The instructions further include instructions to determine an alteration to the portion of the road segment to overcome the one or more deficiencies in the autonomous driving requirements of the portion of the road segment.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 7A-7B are a second example of a requirements deficiency determination scenario.

DETAILED DESCRIPTION

Figure 1:
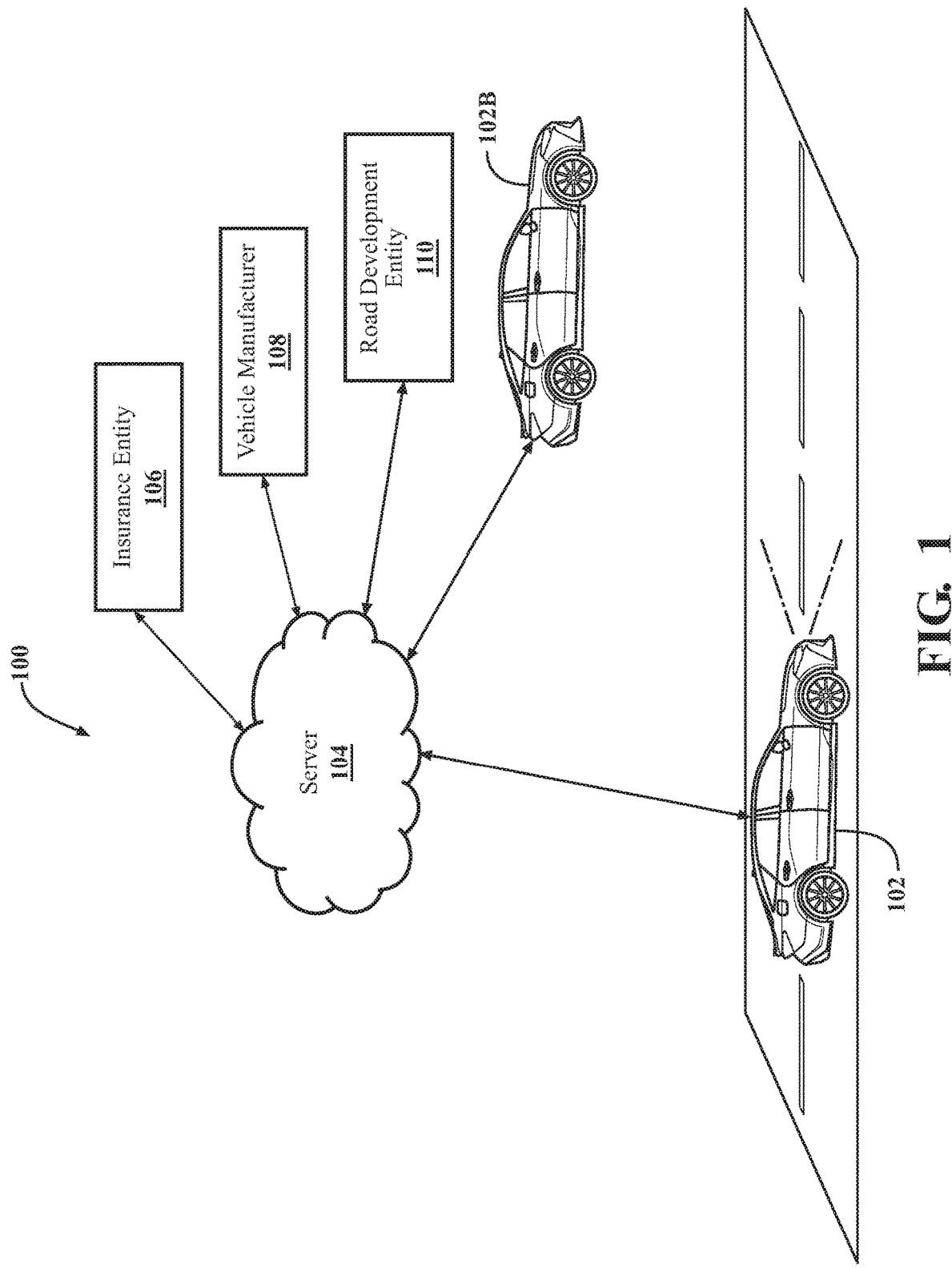
FIG. 1 is an example of an autonomous driving requirements deficiency determination (ADRDD) system.

Systems, methods, and other embodiments associated with resolving one or more deficiencies in autonomous driving requirements for a road segment are disclosed. The autonomous driving requirements may be based on any suitable categorization such as the levels of automation as defined by the National Highway Traffic Safety Administration ("NHTSA"). The NHTSA has defined six levels of automation, ranging from Level 0, where the vehicle is not autonomous or semi-autonomous, to Levels 4 and 5, where the vehicle is fully autonomous. In between, Levels 1 to 3 are varying degrees of automation and the vehicle may be semi-autonomous. As such, the autonomous driving requirements may vary based on the level of automation.

In general, a road segment that is deficient in terms of autonomous driving requirements may be unsuitable for autonomous and/or semi-autonomous driving. As such, autonomous vehicles may avoid including such roads in their travel routes, which may lead to the traffic congestion and overutilization of some roads while other roads are underutilized.

Accordingly, in one embodiment, the disclosed approach is a system that identifies and resolves one or more deficiencies in autonomous driving requirements for a road segment. As an example, a deficiency may be a missing roadside component, an occluded roadside component and/or a characteristic of the road segment that hinder autonomous vehicle operation.

The system employs one or more sensors of the vehicle to detect characteristics of the environment surrounding the vehicles. The detected characteristics may aid, hinder or have no effect on autonomous and/or semi-autonomous vehicle operation. The system receives sensor data for a portion of the road segment from the sensors, and may receive additional sensor data from external sources such as other vehicles or database servers. The system determines autonomous driving requirements for the portion of the road segment based on various factors including any suitable levels of automation, weather conditions, road conditions, location of the road segment, and a timestamp. The system identifies the deficiencies in the autonomous driving requirements for the portion of the road segment based on the received sensor data and the determined autonomous driving requirements for the portion of the road segment. As an example, the system may compare objects identified in the autonomous driving requirements with objects detected in the sensor data to identify objects in the autonomous driving requirements missing from the sensor data. Based on the identified deficiencies, the system may determine one or more alterations to the portion of the road segment to overcome the identified deficiencies. The system may, additionally, determine an alteration to one or more characteristics of the vehicle to overcome the identified deficiencies. The system may transmit the alterations to entities such as a road development entity, a vehicle manufacture, and insurance entity, and/or a second vehicle.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of an autonomous driving requirements deficiency determination (ADRDD) system 100 is shown. The ADRDD system 100 may include various elements, which may be communicatively linked in any suitable form. As an example, the elements may be connected, as shown in FIG. 1. Some of the possible elements of the ADRDD system 100 are shown in FIG. 1 and will now be described. It will be understood that it is not necessary for the ADRDD system 100 to have all the elements shown in FIG. 1 or described herein. The ADRDD system 100 may have any combination of the various elements shown in FIG. 1. Further, the ADRDD system 100 may have additional elements to those shown in FIG. 1. In some arrangements, the ADRDD system 100 may not include one or more of the elements shown in FIG. 1. Further, it will be understood that one or more of these elements may be physically separated by large distances.

The elements of the ADRDD system 100 may be communicatively linked through one or more communication networks. As used herein, the term "communicatively linked" can include direct or indirect connections through a communication channel or pathway or another component or system. A "communication network" means one or more components designed to transmit and/or receive information from one source to another. The one or more of the elements of the ADRDD system 100 may include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short-range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long-range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

The ADRDD system 100 can include one or more connected vehicles 102. As used herein, "vehicle" means any form of motorized transport. In one or more implementations, the vehicle can be an automobile. While arrangements will be described herein with respect to automobiles, it will be understood that embodiments are not limited to automobiles. In some implementations, the vehicle 102 may be any device that, for example, transports passengers and includes the noted sensory devices from which the disclosed predictions and determinations may be generated. The vehicle can be any other type of vehicle that may be used on a roadway, such as a motorcycle. In some implementation, the vehicle can be a watercraft, an aircraft, or any other form of motorized transport. The vehicle 102 is a connected vehicle that is communicatively linked to one or more elements of the ADRDD system 100.

The ADRDD system 100 can include one or more entities that may exchange information with the vehicle 102. The entities may include other vehicles 102B, insurance entities 106, vehicle manufacturers 108, and/or road development entities 110. The vehicle 102 and the entities 102B, 106, 108, 110 may exchange information such as sensor data, autonomous driving requirements, identified deficiencies, and determined alterations to the road segment and/or the vehicle. The other vehicles 102B may update their vehicle operation based on the information. The insurance entities 106 may incorporate the information into their risk analysis for insurance purposes. The vehicle manufacturers 108 may update their vehicle designs and/or component selection based on the information. The road development entities 110 may construct roads, install and select components based on the information.

The ADRDD system 100 can include one or more servers 104. The server(s) 104 may be, for example, cloud-based server(s) or edge-based server(s). The server(s) 104 can communicate with one or more vehicles 102 over a communication module, such as by any type of vehicle-to-cloud (V2C) communications, now known or later developed. The server(s) 104 can receive data from and send data to the vehicle(s) 102. Alternatively and/or additionally, the vehicle 102 and the other entities 102B, 106, 108, 110 may communicate over other suitable means such as vehicle-to-vehicle (V2V) communications, vehicle-to-everything (V2X) communications.

Figure 2:
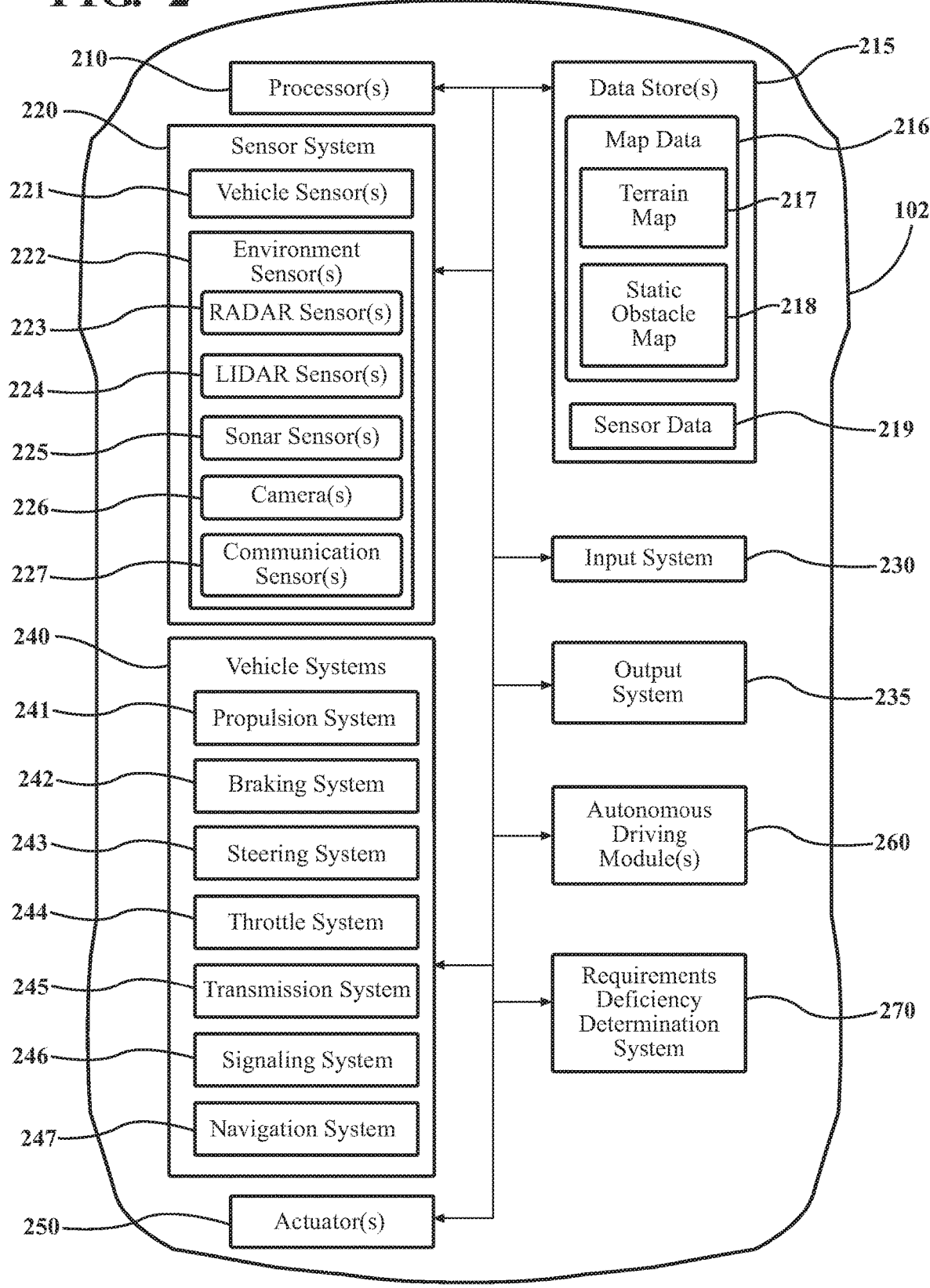
FIG. 2 illustrates a block diagram of a vehicle incorporating a requirements deficiency determination system.

Referring to FIG. 2, a block diagram of the vehicle 102 incorporating a requirements deficiency determination system 270 is illustrated. The vehicle 102 includes various elements. It will be understood that in various embodiments, it may not be necessary for the vehicle 102 to have all of the elements shown in FIG. 2. The vehicle 102 can have any combination of the various elements shown in FIG. 2. Further, the vehicle 102 can have additional elements to those shown in FIG. 2. In some arrangements, the vehicle 102 may be implemented without one or more of the elements shown in FIG. 2. While the various elements are shown as being located within the vehicle 102 in FIG. 2, it will be understood that one or more of these elements can be located external to the vehicle 102. Further, the elements shown may be physically separated by large distances. For example, as discussed, one or more components of the disclosed system can be implemented within a vehicle while further components of the system are implemented within a cloud-computing environment, as discussed further subsequently.

Some of the possible elements of the vehicle 102 are shown in FIG. 2 and will be described along with subsequent figures. However, a description of many of the elements in FIG. 2 will be provided after the discussion of FIGS. 3-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 2, the vehicle 102 includes a requirements deficiency determination system 270 that is implemented to perform methods and other functions as disclosed herein relating to resolving one or more deficiencies in autonomous driving requirements for a road segment. As will be discussed in greater detail subsequently, the requirements deficiency determination system 270, in various embodiments, may be implemented partially within the vehicle 102 and may further exchange communications with additional aspects of the requirements deficiency determination system 270 that are remote from the vehicle 102 in support of the disclosed functions. Thus, while FIG. 3 generally illustrates the requirements deficiency determination system 270 as being self-contained, in various embodiments, the requirements deficiency determination system 270 may be implemented within multiple separate devices some of which may be remote from the vehicle 102.

Figure 3:
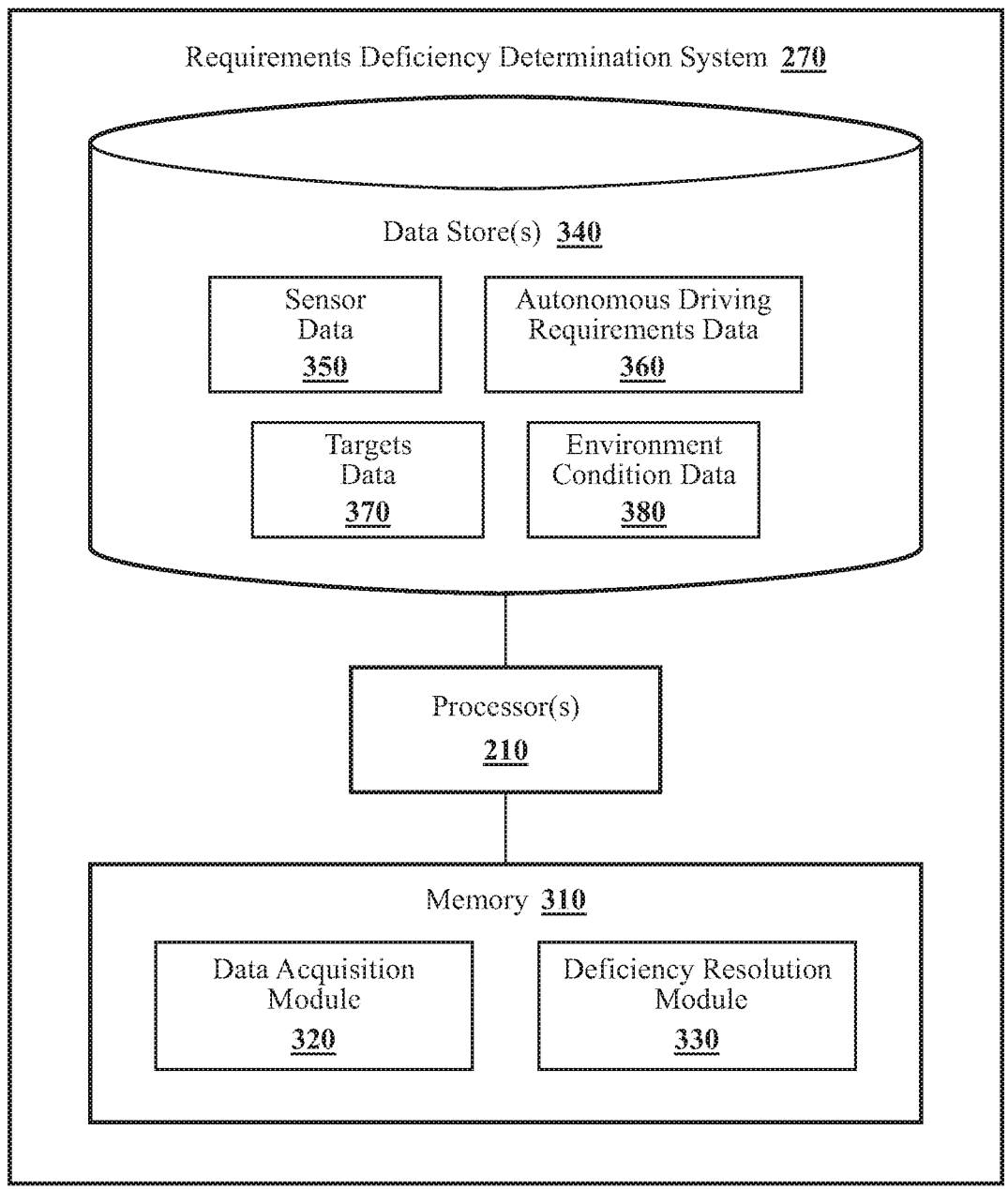
FIG. 3 illustrates one embodiment of a requirements deficiency determination system.

With reference to FIG. 3, one embodiment of the requirements deficiency determination system 270 of FIG. 2 is further illustrated. The requirements deficiency determination system 270 is shown as including a processor 210 from the vehicle 102 of FIG. 2. Accordingly, the processor 210 may be a part of the requirements deficiency determination system 270, the requirements deficiency determination system 270 may include a separate processor from the processor 210 of the vehicle 102, and/or the requirements deficiency determination system 270 may access the processor 210 through a data bus or another communication path. In further aspects, the processor 210 is a cloud-based resource that communicates with the requirements deficiency determination system 270 through a communication network. In one embodiment, the requirements deficiency determination system 270 includes a memory 310 that stores a data acquisition module 320 and a deficiency resolution module 330. The memory 310 is a random-access memory (RAM), read-only memory (ROM), a hard-disk drive, a flash memory, or other suitable memory for storing the modules 320 and 330. The modules 320 and 330 are, for example, computer-readable instructions within the physical memory 310 that when executed by the processor 210 cause the processor 210 to perform the various functions disclosed herein.

In one embodiment, the data acquisition module 320 includes instructions that function to control the processor 210 to receive sensor data 350 for a portion of the road segment from at least one sensor of a vehicle 102. In such a case, the sensor data 350 may originate from the sensor system 220 of the vehicle 102. As an option, the data acquisition module 320 may include instructions that function to control the processor 210 to receive additional sensor data for the portion of the road segment from one or more external sources. The external sources may include any entities capable of wireless communication such as other vehicles, roadside units, servers, and/or databases.

The data acquisition module 320, in one embodiment, may control respective sensors (e.g., cameras, communication sensors, etc.) of the vehicle 102 to provide the data inputs in the form of the sensor data 350. Additionally, while the data acquisition module 320 is discussed as controlling the various sensors to provide the sensor data 350, in one or more embodiments, the data acquisition module 320 may employ other techniques to acquire the sensor data 350 that are either active or passive. For example, the data acquisition module 320 may passively sniff the sensor data 350 from a stream of electronic information provided by the various sensors to further components within the vehicle 102. Moreover, the data acquisition 320 may undertake various approaches to fuse data from multiple sensors when providing the sensor data 350. Thus, the sensor data 350, in one embodiment, represents a combination of perceptions acquired from multiple sensors.

The sensor data 350 may include detected objects and/or markings in the environment surrounding the vehicle 102. The sensor data 350 may further include metadata associated with the detected objects and markings. The associated metadata may indicate the type of the detected object and, in the case where the detected object is a traffic device (e.g., traffic lights, road signs, etc.), the function of the detected object, and whether the detected object is functional. Environment sensors 222 (FIG. 2) may determine the functionality of the traffic device based on observation and image recognition algorithms. As an example, a camera 226 may detect a traffic light switching periodically between stop and go signals, determine the traffic light is functional, and update the metadata associated with the traffic light to indicate the traffic light is functional. As another example, the camera 226 may detect that a portion of a traffic sign is occluded and is unreadable, causing the traffic sign to be nonfunctional. In one embodiment, the environment sensors 222 may determine the functionality of the traffic device based on communicating with the traffic device. As an example, an RFID reader may scan a roadside traffic sign such as a stop sign for an embedded RFID chip, and transmit a signal to the embedded RFID chip. The RFID reader may determine whether the stop sign is electronically functional based on the response signal received from the embedded RFID chip. The metadata may include additional information associated with the detected object such as the geographic coordinates of the detected object. The sensor data may be in any suitable format such as point cloud maps, image files, and/or text files.

The sensor data 350 may further include the functional status of the sensors in the sensor system 220. As an example, if the sensors 221 and 222 are damaged, the sensor data 350 may include information about the type of sensor, the type of damage, the time when and the location where the damage occurred, and the cause of the damage. The sensor data 350 may include data indicating reduced quality of the sensor data received from a damaged or incapable sensor. The functional status of the sensors may be used to determine deficiencies in the autonomous driving requirements as will be discussed below.

The sensor data 350 may be stored in a data store 340 of the requirements deficiency determination system 270. Accordingly, in one embodiment, the requirements deficiency determination system 270 includes the data store 340. The data store 340 is, in one embodiment, an electronic data structure (e.g., a database) stored in the memory 310 or another data store and that is configured with routines that can be executed by the processor 210 for analyzing stored data, providing stored data, organizing stored data, and so on. Thus, in one embodiment, the data store 340 stores data used by the modules 320 and 330 in executing various functions. In one embodiment, the data store 340 includes the sensor data 350 along with, for example, autonomous driving requirements data 360, targets data 370, environment condition data 380 and or other information that is used by the modules 320 and 330.

The autonomous driving requirements may include characteristics that make a portion of the road segment suitable for autonomous driving. The characteristics may include, for example, the presence of road delineators such as lane markers, road edge markers, traffic signs, traffic lights, and communicative roadside units. The characteristics may further include the geographic coordinates of and the spacing between the road delineators. Other suitable characteristics are available. The autonomous driving requirements may be based on the vehicle type and/or the level of autonomous driving, which may vary from manual driving (by a driver) to fully autonomous driving with no driver involvement. The levels of automation may be categorized in any suitable manner such as the NHTSA's levels of automation, as mentioned above, or any other suitable categorization.

The autonomous driving requirements may be based on one or more factors included in the environment condition data 380. In other words, the autonomous driving requirements may vary based on a weather condition, a road condition, a location condition of the road segment, or a timestamp. As an example, the autonomous driving requirements may include reflective road edge marking poles when the vehicle is driving through a snowfall or heavy rain. As another example, the autonomous driving requirements may include trimming back tree branches that are occluding a road sign. As another example, the autonomous driving requirements may include street lights being illuminated when it is nighttime and dark.

The autonomous driving requirements may be determined in the vehicle 102. As an example, the deficiency resolution module 330 may include instructions that function to control the processor 210 to determine the autonomous driving requirements for the portion of the road segment. The deficiency resolution module 330 may determine the autonomous driving requirements based on the sensor data 350, the environment condition data 380, and other types of data associated with the vehicle such as vehicle type, levels of autonomous operation, and/or any suitable data. The deficiency resolution module 330 may determine the autonomous driving requirements using any suitable algorithm or set of guidelines. The guidelines may be stored in the data store(s) 215, 340. Alternatively and/or additionally, the deficiency resolution module 330 may receive the guidelines associated with determining autonomous driving requirements from sources external to the vehicle 102 such as a database server.

The autonomous driving requirements data 360 may include a subset of or all the autonomous driving requirements. As an example, the subset may include a minimum set of autonomous driving requirements. In other words, the subset may include the least amount of characteristics of a road segment required to make the road segment suitable for autonomous driving. As another example, the subset may include all of the autonomous driving requirements. As another example, the subset may include more than the minimum set and less than all of the autonomous driving requirements.

The targets data 370 may include information about one or more entities that may exchange information with the vehicle 102. The vehicle 102 and the entities 102B, 106, 108, 110 may exchange information such as sensor data, autonomous driving requirements, identified deficiencies, and determined alterations to the road segment(s) and/or the vehicle 102. The entities may include other vehicles 102B, insurance entities 106, vehicle manufacturers 108, and/or road development entities 110. The other vehicles 102B may update their vehicle operation based on the information. The insurance entities 106 may incorporate the information into their risk analysis for insurance purposes. The vehicle manufacturers 108 may update their vehicle designs and/or component selection based on the information. The road development entities 110 may construct roads, install and select components based on the information.

The environment condition data 380 may include information about conditions in the environment for multiple road segments such as a weather condition, road condition, location of the road segment(s), and/or timestamp. A weather condition may include, as an example, presence of precipitation such as snow, rain, and/or hail. The weather condition may further include impacts of weather such as fog levels, fallen snow levels (i.e. the amount of snow on the ground), and/or flooding. The weather condition may be updated periodically and/or on-demand.

A road condition may include information about the physical condition of the road segment(s). The road condition may include the presence of potholes, road debris, overgrown vegetation, the slope of the road segment(s), the curvature of the road segment(s), the friction level of the road segment(s), and/or shade over the road segment(s) (e.g., the road segment is covered by the ceiling of a tunnel or by trees). A location of the road segment(s) may include geographic coordinates of the road segment(s), the position of the road segment(s) relative to other road segments, traffic rules based on the jurisdiction at the location of the road segment(s), and traffic levels at the road segment(s). The timestamp may include the time and/or date when the vehicle 102 traveled on or past the road segment(s). The conditions in the environment condition data 380 may pertain to one or more road segments.

The deficiency resolution module 330 includes instructions that function to control the processor 210 to determine autonomous driving requirements for the portion of the road segment.

The deficiency resolution module 330 includes instructions that function to control the processor 210 to identify the one or more deficiencies in the autonomous driving requirements, or more specifically, in the autonomous driving requirements data 360 for the portion of the road segment. The one or more identified deficiencies may be based on the received sensor data 350 and the determined autonomous driving requirements data 360 for the portion of the road segment. The deficiency resolution module 330 may apply any suitable algorithm to identify the deficiencies in the autonomous requirements for the portion of the road segment. As an example, the deficiency resolution module 330 may compare the sensor data 350 to the autonomous driving requirements data 360 and identify the one or more objects included in the autonomous driving requirements data 360 that are missing in the sensor data 350. The deficiency resolution module 330 may then identify the missing objects as the deficiencies in the autonomous driving requirements. As another example, the deficiency resolution module 330 may compare the functionality of the detected traffic devices with the autonomous driving requirements data 360 to identify deficiencies. In other words, the deficiencies may include one or more of missing roadside components, occluded roadside components, and non-functional roadside components. As another example, the deficiency resolution module 330 may compare the quality of sensor data 350 with the autonomous driving requirements data 360 to identify deficiencies. As an example, the deficiencies may include low quality images, indicating a sensor in the sensor system is not functioning properly, or at least the sensor was not functioning properly at a certain time.

The deficiency resolution module 330 includes instructions that function to control the processor 210 to determine an alteration to the portion of the road segment to overcome the one or more deficiencies in the autonomous driving requirements for the portion of the road segment. Upon identifying the deficiencies, the deficiency resolution module 330 can determine one or more alterations to resolve the deficiencies. The deficiency resolution module 330 may use any suitable algorithm such as a machine learning algorithm or an artificial intelligence process to identify and achieve the alteration required.

The deficiency resolution module 330 may, upon identifying the missing objects on the road segment(s), determine that the alteration required is to install the missing objects as identified in the autonomous driving requirements data. The alterations may include installing traffic devices at certain locations on the road. As an example, the vehicle 102 may be travelling on a curved road with missing lane markers. In such an example, the alterations may include installing lane markers of a defined standard at a defined location. As another example, the alterations may include trimming back branches of an identified tree where the branches are occluding a traffic sign. As another example, the alterations may include replacing a traffic device that is no longer functioning or is obsolete. As another example, the alterations may include moving a traffic device from one location to another location. As another example, the alterations may include installing a traffic sign on a sloped road with low visibility.

The deficiency resolution module 330 may include instructions that function to control the processor 210 to determine an alteration to one or more characteristics of the vehicle 102 to overcome the one or more deficiencies in the autonomous driving requirements for the portion of the road segment. In some cases, altering the environment may not be sufficient to overcome the deficiency, and in such a case, the deficiency resolution module 330 may determine one or more alterations to the vehicle 102 to accommodate the deficiency. The alterations may be a change to the vehicle operation or control. As an example, a road segment may not have space for road edge markers. In such an example, the alteration(s) may include detecting another object such as a fence, a mountainside, a wall and/or a body of water. As another example, the alteration(s) may include the vehicle 102 using a center line of a two-way lane as a guide. As another example, the alteration(s) may include retrieving information about the location from a map stored in the vehicle 102 or a map database server. As an example, when the vehicle 102 travels through a dark tunnel, light sensitive environment sensors 222 may be configured to a low-light environment. In other words, light sensitive environment sensors 222 such as cameras 226 may respond to the low-light environment (or dimly lit environment) by increasing the aperture of the camera lens so as to let in more light. However, depending on the position of the sun when the vehicle 102 emerges from the tunnel, the lens with the increased aperture may be overexposed to strong sunlight as the vehicle 102 exits the tunnel, which may damage the camera 226. In such an example, the alterations may include installing overhead lights inside the tunnel. Additionally, the alterations may include decreasing the aperture of light sensitive environment sensors 222 of the vehicle 102 before emerging from the tunnel, and/or the installation or replacement of a vehicle component on the vehicle 102. As an example, the alterations may include the replacement of one type of sensor with another at defined positions on the vehicle 102. The deficiency resolution module 330 may, in some embodiments, select the alterations based on one or more factors that may include cost of devices, cost of maintenance and installation, environmental impact of devices and device installation, and/or effectiveness of devices.

The deficiency resolution module 330 may include instructions that function to control the processor 210 to send the alteration(s) to an entity. In some embodiments, the entity can be a database server, a second vehicle 102B, an insurance entity 106, a vehicle manufacturer 108, or a road development entity 110. In general, the deficiency resolution module 330 may send the actions to be taken to any interested entity. As previously mentioned, the action to be taken may be an alteration to the portion of the road segment. Additionally, the action to be taken may be an alteration to the characteristics of the vehicle. As such, the actions to be taken may be of interest to the road development entity 110 that can alter the road by carrying out the actions to be taken such as installing roadside devices, and cutting back trees. Additionally, the actions may be of interest to the vehicle manufacturer 108 as the actions may inform the vehicle manufacturer 108 of alterations that may be made to the vehicles 102 to accommodate the deficiencies in the autonomous driving requirements for the road. Data about the entities that may receive information about alterations may be stored in targets data 370. The deficiency resolution module 330 may transmit data associated with the alterations to the entities using any suitable communication protocol.

The deficiency resolution module 330 may include instructions that function to control the processor 210 to update an autonomous driving readiness map based on the alteration. The autonomous driving readiness map indicates road suitability for autonomous operation. In other words, the autonomous driving readiness map is a map that indicates the level of autonomous driving readiness of one or more road segments. The map may be an image or text. The map may include geographic coordinates of the road segment(s) in the environment. The map may further include any significant information for the road segment(s) such as the current level of autonomous driving readiness of the road segment(s), deficiencies in the autonomous driving requirements, and/or alterations to be made in the road segment(s) and/or vehicle(s). The deficiency resolution module 330 may update the autonomous driving readiness map such that the map includes coordinates of locations where alterations may be made. As an example, the map may include the geographic coordinates where a roadside device may be installed and the type of roadside device.

Figure 4:
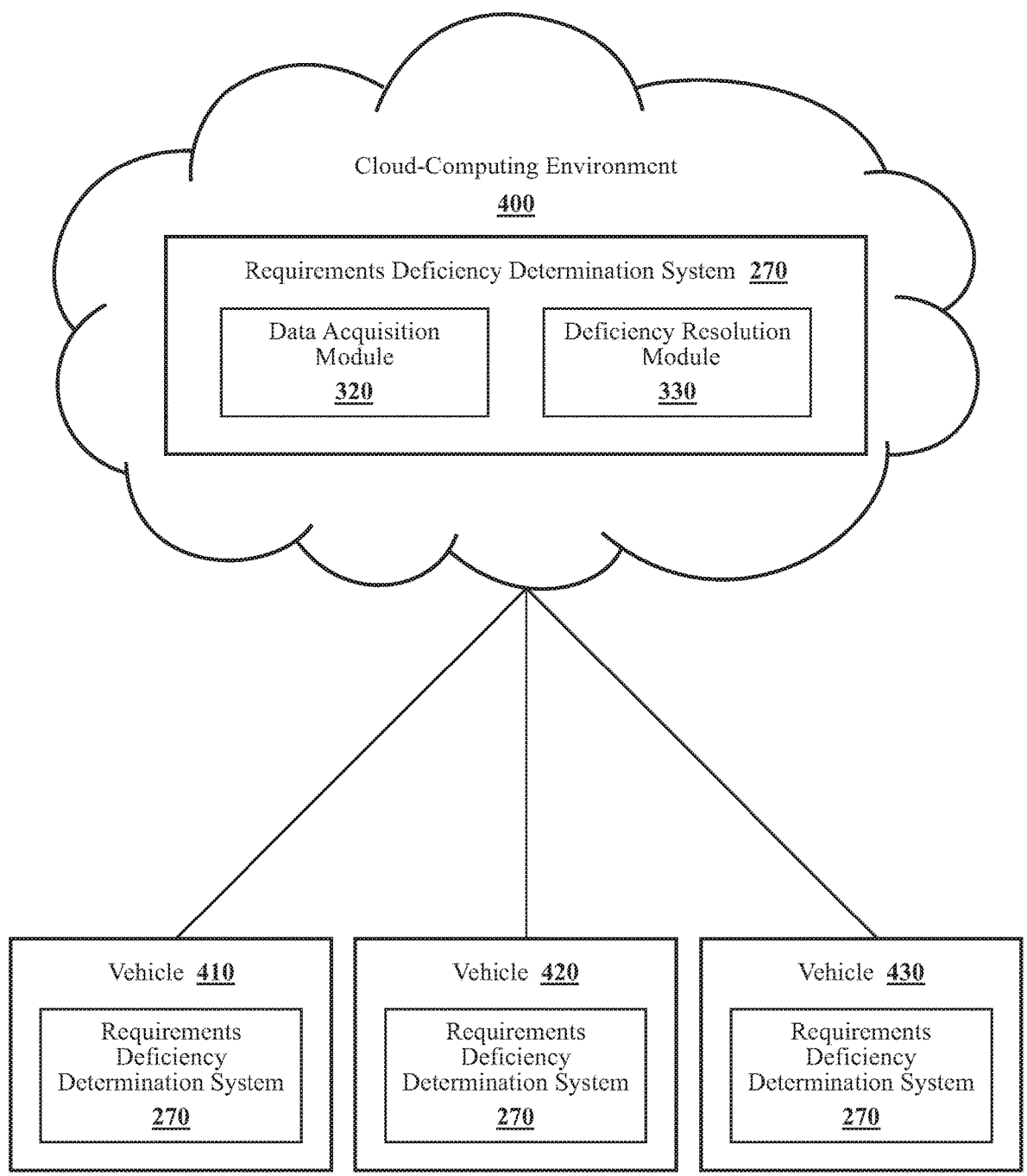
FIG. 4 illustrates a diagram of a requirements deficiency determination system in a cloud-based configuration.

The requirements deficiency determination system 270 may be further implemented as a cloud-based system that functions within a cloud-computing environment 400 as illustrated in relation to FIG. 4. That is, for example, the requirements deficiency determination system 270 may acquire telematics data (i.e., sensor data 350) from vehicles and execute as a cloud-based resource that is comprised of devices (e.g., distributed servers) remote from the vehicle 102 to resolve one or more deficiencies in autonomous driving requirements for a road segment. Accordingly, the requirements deficiency determination system 270 may communicate with vehicles (e.g., vehicles 410, 420, and 430) that are geographically distributed. In one approach, the cloud-based requirements deficiency determination system 270 collects the sensor data 350 from components or separate instances of the requirements deficiency determination system 270 that are integrated with the vehicles 410-430.

Along with the communications, the vehicles 410-430 may provide sensor data 350. As such, the cloud-based aspects of the requirements deficiency determination system 270 may then process the sensor data 350 separately for the vehicles 410-430 to determine the one or more deficiencies in autonomous driving requirements for a road segment. In further aspects, the vehicle-based systems may perform part of the processing while the cloud-computing environment 400 may handle a remaining portion or function to validate results of the vehicle-based systems. It should be appreciated that apportionment of the processing between the vehicle and the cloud may vary according to different implementations. Additional aspects of the cloud computing environment 400 are discussed above in relation to components of the requirements deficiency determination system 270 and FIG. 3

Figure 5:
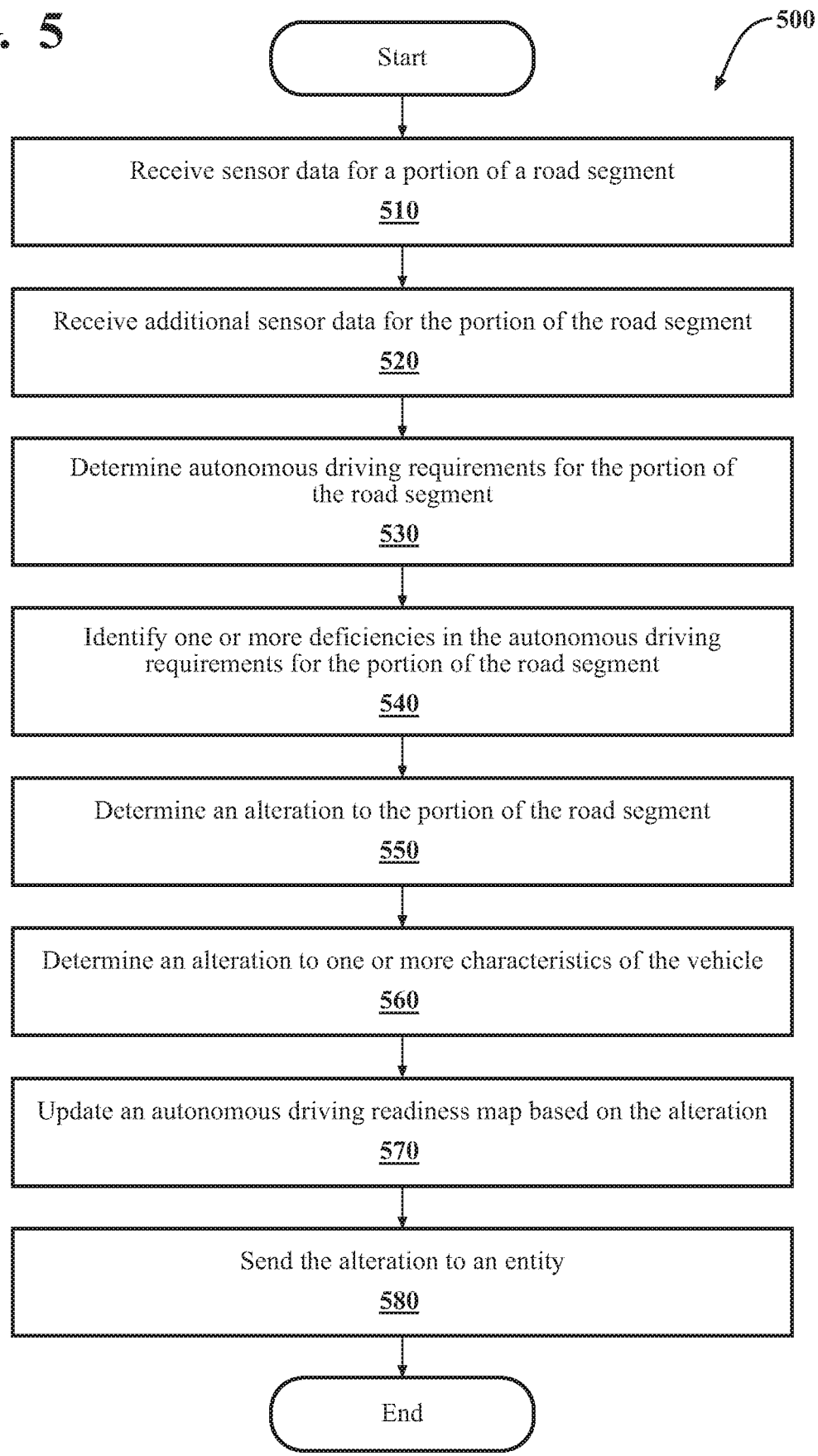
FIG. 5 is a flowchart illustrating one embodiment of a method associated with resolving one or more deficiencies in autonomous driving requirements for a road segment.

FIG. 5 illustrates a method 500 for resolving one or more deficiencies in autonomous driving requirements for a road segment. The method 500 will be described from the viewpoint of the vehicle 102 of FIG. 2 and the requirements deficiency determination system 270 of FIG. 3. However, the method 500 may be adapted to be executed in any one of several different situations and not necessarily by the vehicle 102 of FIG. 2 and/or the requirements deficiency determination system 270 of FIG. 3.

At step 510, the data acquisition module 320 may cause the processor(s) 210 to receive sensor data 350 for a portion of a road segment from at least one sensor 221, 222 of a vehicle 102. As previously mentioned, the data acquisition module 320 may employ active or passive techniques to acquire the sensor data 350.

At step 520, the data acquisition module 320 may cause the processor(s) 210 to receive additional sensor data for the portion of the road segment from one or more external sources such as a second vehicle 102B. As an example, the additional sensor data may include images of the road segment from sensors on the second vehicle 102B.

At step 530, the deficiency resolution module 330 may cause the processor(s) 210 to determine autonomous driving requirements for the portion of the road segment, as discussed above.

At step 540, the deficiency resolution module 330 may cause the processor(s) 210 to identify one or more deficiencies in the autonomous driving requirements for the portion of the road segment based on the received sensor data 350 and the determined autonomous driving requirements, specifically, the autonomous driving requirements data 360 for the portion of the road segment. The deficiency resolution module 330 may use any suitable algorithm, as previously discussed, to identify the deficiencies in the autonomous driving requirements.

At step 550, the deficiency resolution module 330 may cause the processor(s) 210 to determine an alteration to the portion of the road segment to overcome the one or more deficiencies in the autonomous driving requirements of the portion of the road segment, as previously disclosed. The deficiency resolution module 330 may determine the alterations to the road segment(s) based on the identified deficiencies, as previously discussed.

At step 560, the deficiency resolution module 330 may cause the processor(s) 210 to determine an alteration to one or more characteristics of the vehicle 102 to overcome the one or more deficiencies in the autonomous driving requirements of the portion of the road segment. In addition to determining an alteration to the road segment, the deficiency resolution module may determine an alteration to the vehicle 102.

At step 570, the deficiency resolution module 330 may cause the processor(s) 210 to update an autonomous driving readiness map based on the alteration. The deficiency resolution module 330 may update the map based on the alteration to the road segment and if applicable, the alteration to the vehicle 102. The map may include geographic coordinates for the road segment and the alterations associated with the road segment.

At step 580, the deficiency resolution module 330 may cause the processor(s) 210 to send the alteration(s) to an entity. As an example, the entity may be one or more of a database server 104, a second vehicle 102B, an insurance entity 106, a vehicle manufacturer 108, and a road development entity 110.

Figure 6:
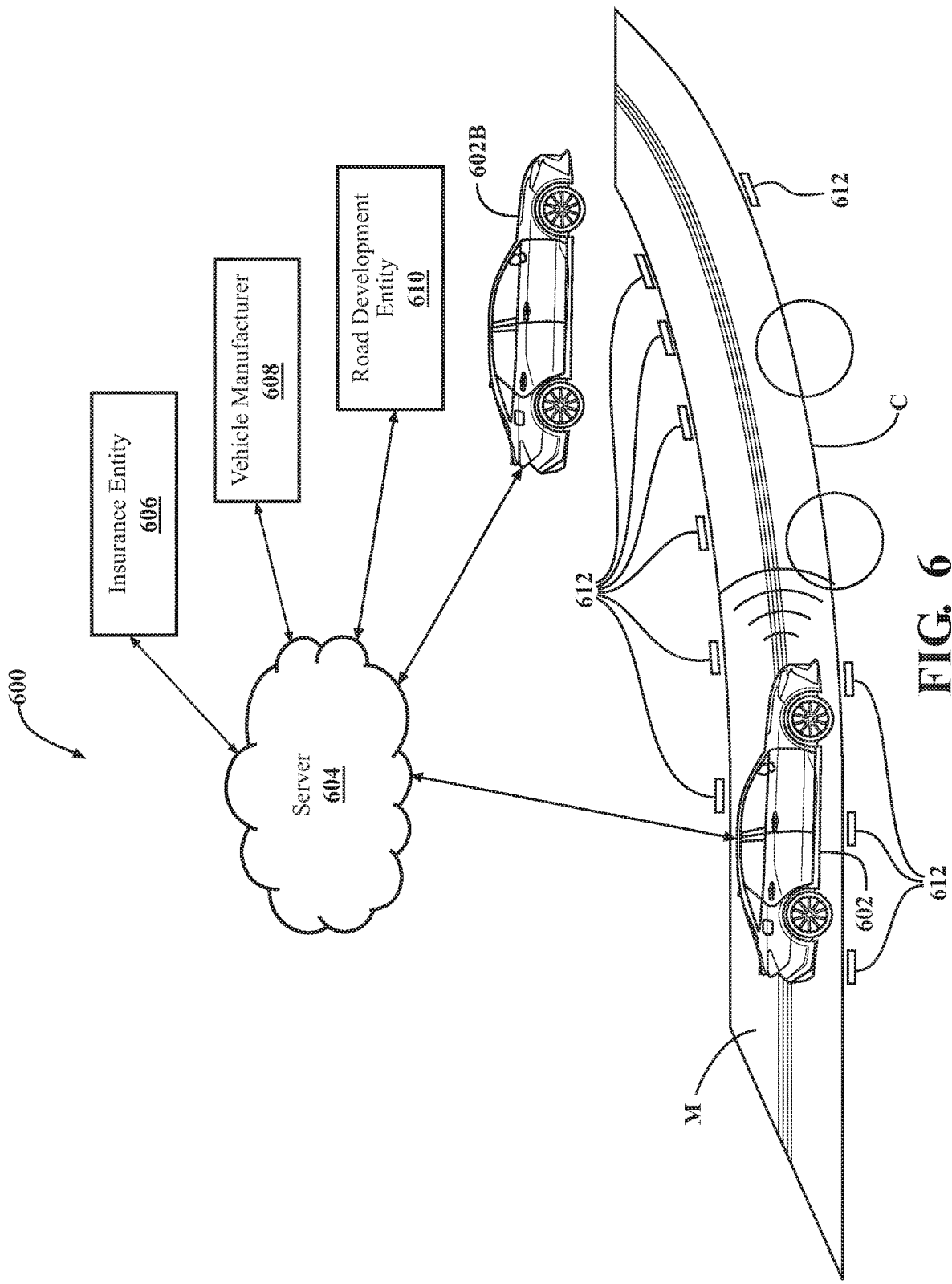
FIG. 6 is a first example of a requirements deficiency determination scenario.

A first non-limiting example of the operation of the ADRDD system 100 and/or one or more of the methods will now be described in relation to FIG. 6. FIG. 6 shows an example of a requirements deficiency determination scenario 600.

In FIG. 6, the vehicle 602, which is similar to vehicle 102, may be traveling along a curved road M that has road edge delineators 612. The road edge delineators 612 may include retroflective devices that are capable of retroflecting light.

The requirements deficiency determination system 270, or more specifically, the data acquisition module 320 may receive sensor data 350 for the curved road M from forward-facing cameras 226. The forward-facing cameras 226 may detect the road edge delineators along the curved road M.

The requirements deficiency determination system 270, or more specifically the deficiency resolution module 330, may determine the autonomous driving requirements (based on a level of autonomous operation) for the curved road M as detailed above. The autonomous driving requirements may include, for example, having road edge delineators 612 installed 20 feet apart. The deficiency resolution module 330 may identify the deficiency in the autonomous driving requirements by comparing the sensor data 350 to the autonomous driving requirements data 360. In this case, the sensor data 350 may indicate that there are no road edge delineators that are installed 20 feet apart at the curve C. As such, the deficiency resolution module 330 may determine that three road edge delineators 612 installed 20 feet apart are missing at the curve C. The deficiency resolution module 330 may also determine that the road M needs to be altered to address the deficiency. One example of an alteration may include installing three road edge delineators 612 20 feet apart in predetermined locations. The deficiency resolution module 330 may determine alternate alterations that may differ from the autonomous driving requirements. The deficiency resolution module 330 may provide one or more alterations to entities that have been identified in the targets data 370 as entities interested in information pertaining to alterations. As previously mentioned, the deficiency resolution module 330 may select the alteration to the road segment based on one or more factors that may include cost of devices, cost of maintenance and installation, environmental impact of devices and device installation, and effectiveness of devices.

The deficiency resolution module 330 may update an autonomous driving readiness map with the determined alterations that include the geographic coordinates where the road edge delineators should be installed and the type of road edge delineators. The deficiency resolution module 330 may transmit the alterations to other entities such as a database server 604, a second vehicle 602B, an insurance entity 606, a vehicle manufacturer 608, and/or a road development entity 610. The alterations may be transmitted in any suitable form such as an image and/or as text.

Figure 7A:
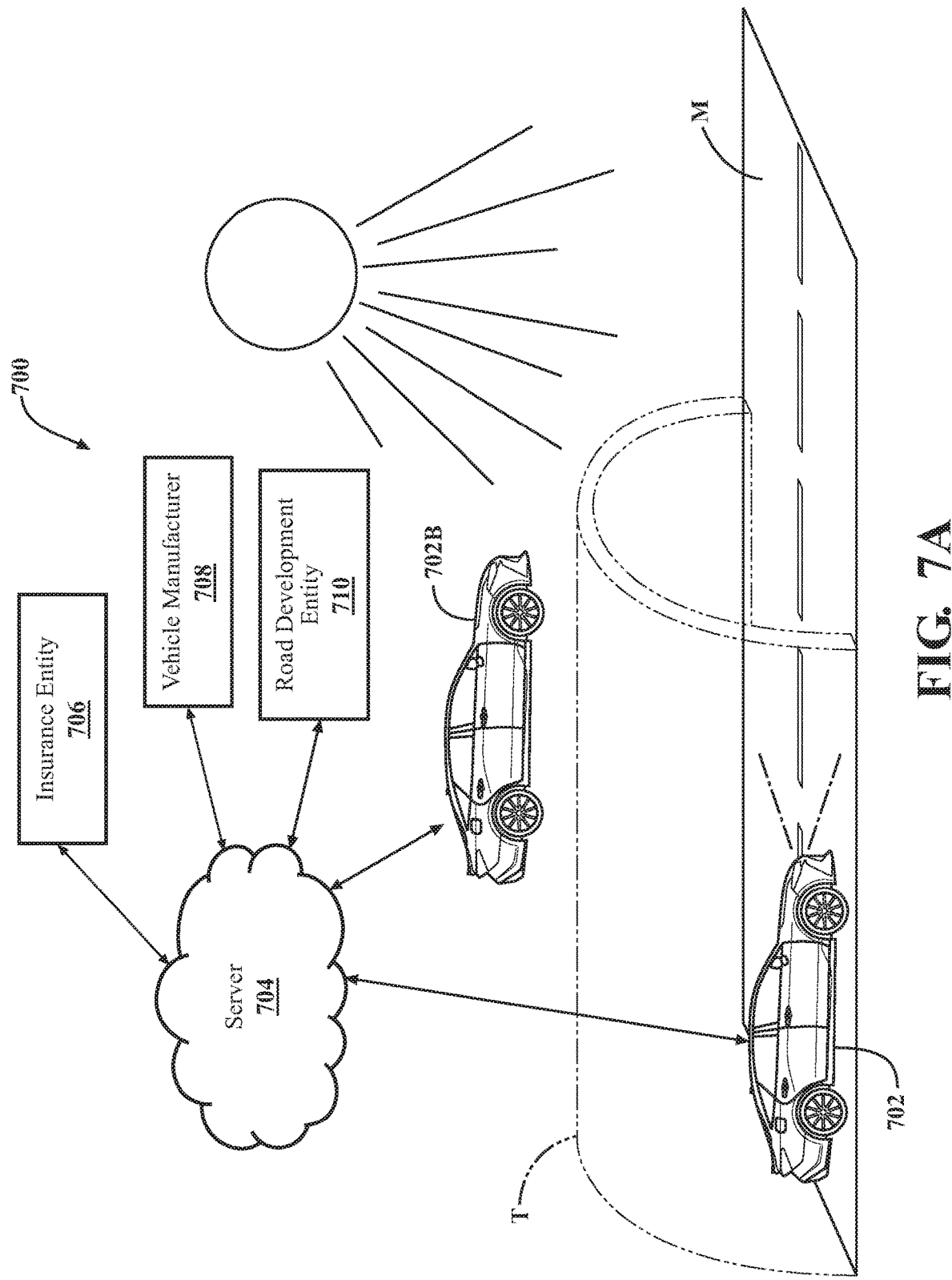

A second non-limiting example of the operation of the ADRDD system 100 and/or one or more of the methods will now be described in relation to FIGS. 7A-7B. FIGS. 7A-7B show an example of a requirements deficiency determination scenario 700.

In FIGS. 7A-7B, the vehicle 702, which is similar to vehicle 102, may be travelling through and emerging from an unlit, darkened tunnel T and there is low to no cloud cover, making the sun very bright. In FIG. 7A, the vehicle 102 is travelling through the tunnel T, and due to the low light, a vehicle camera 226 may increase the aperture of its lens to let in more light. In FIG. 7B, as the vehicle 702 emerges from the tunnel T to the bright sunlight, the vehicle camera 226 having a large aperture may over-expose the lens, which may affect the quality of the sensor data 350 and/or may damage the vehicle camera 226.

The requirements deficiency determination system 270, or more specifically, the data acquisition module 320 may receive sensor data 350 from the vehicle camera 226. The sensor data 350 from the vehicle camera 226 may include information indicating that the lens of the vehicle camera 226 was overexposed as the vehicle 702 exited the tunnel T.

The sensor data 350 may be corrupted or damaged due to overexposure. The data acquisition module 320 may receive additional sensor data from external sources such as another vehicle 702B that have travelled through and emerged from the tunnel under similar conditions (such as low to no cloud cover, similar time of day, similar season).

The requirements deficiency determination system 270, or more specifically the deficiency resolution module 330, may determine the autonomous driving requirements (based on a level of autonomous operation) for exiting the tunnel T. The autonomous driving requirements may include a sensor 222 capable of capturing the environment as the vehicle 702 exits the tunnel T. The deficiency resolution module 330 may identify the deficiency in the autonomous driving requirements by comparing the corrupt or damaged sensor data 350 to the autonomous driving requirements data 360. The deficiency resolution module 330 may determine that characteristics of the road segment and the vehicle 702 may need to be altered to address the deficiency. One example of an alteration may include installing light fixtures inside the tunnel so the aperture of the sensor 222 may not be as large inside the tunnel. As such, when the vehicle 702 emerges from the tunnel T, the smaller aperture does not let in excess light, leading to overexposure. Another example of an alteration may include installing an electronic warning device near the exit of the tunnel T. The electronic warning device may be, as an example, an RFID device and may communicate that the vehicle 702 is nearing the exit of the tunnel T. In response to receiving the communication from the RFID device, the vehicle 702 may adjust the aperture of the sensors 222. Alterations to the road segment may be combined with alterations to the vehicle 702. As an example, an alteration of the vehicle 702 may include decreasing the aperture of the camera lens a short period before the vehicle 702 exits the tunnel T or at an identified position in the tunnel T. Another example of an alteration of the vehicle 702 may include adjusting the vehicle operation such as the vehicle 702 reducing its speed as the vehicle 702 approaches the exit of the tunnel T, providing more time to permit the vehicle camera 226 to adjust to the sunlight. Another example of an alteration of the vehicle 702 may include replacing the vehicle camera 226 or installing a different type of vehicle camera 226. The deficiency resolution module 330 may select which alterations to provide to other entities based on one or more factors that may include cost of replacement vehicle components, reprogramming vehicle controls, cost of maintenance and installation, environmental impact, design considerations, and effectiveness of the alteration.

Similar to the FIG. 6, the deficiency resolution module 330 may update the autonomous driving readiness map with metadata indicating the vehicle alteration required and the location necessitating the alteration. The deficiency resolution module 330 may transmit the alterations to other entities such as a database server 704, a second vehicle 702B, an insurance entity 706, a vehicle manufacturer 708, and/or a road development entity 710. As an example, the second vehicle 702B that may update its vehicle operation to include the alterations, the vehicle manufacturer 708 that may replace or reprogram vehicle components based on the alterations, and/or the road development entity install components based on the alterations.

Figure 8:
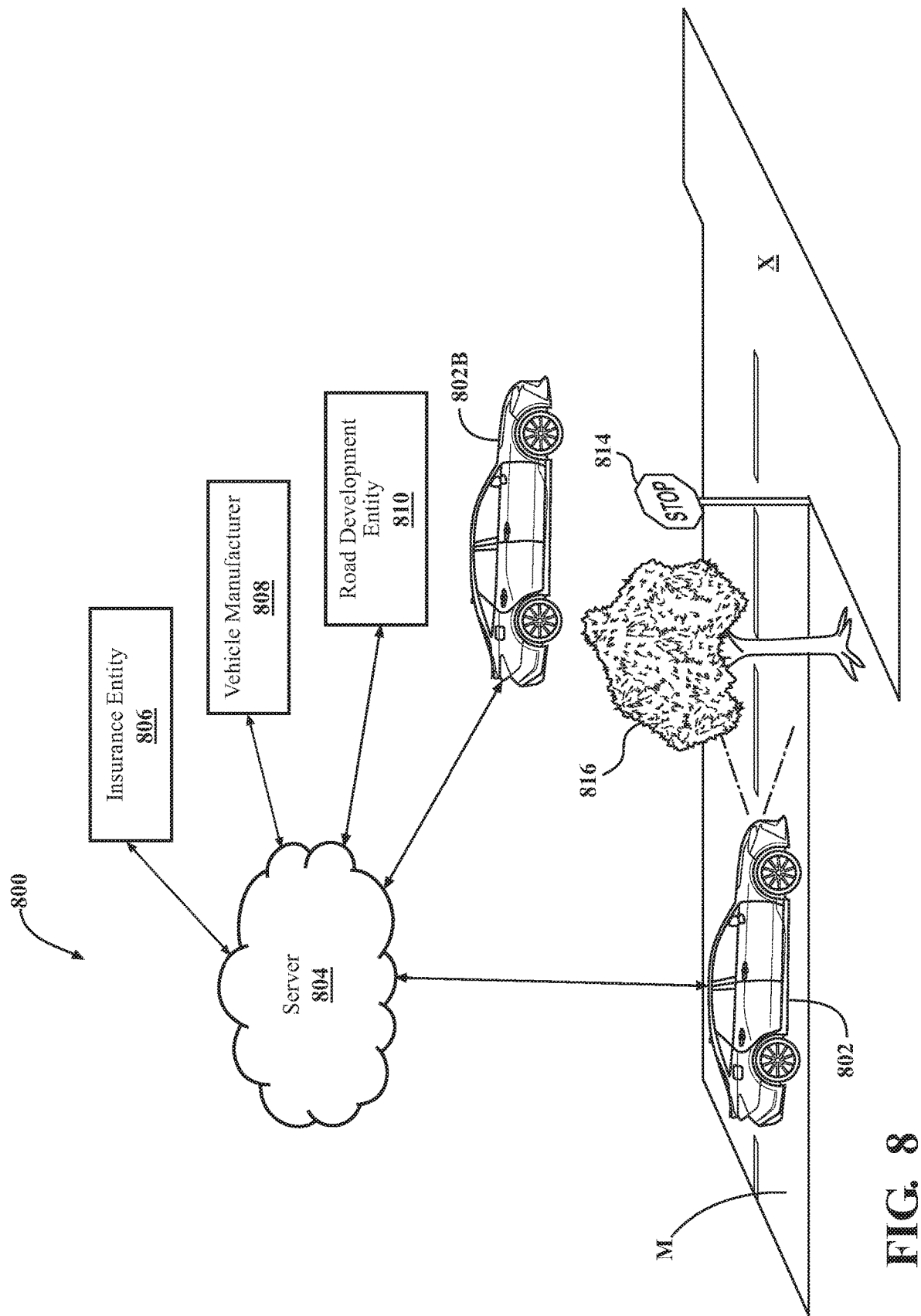
FIG. 8 is a third example of a requirements deficiency determination scenario.

A third non-limiting example of the operation of the ADRDD system 100 and/or one or more of the methods will now be described in relation to FIG. 8. FIG. 8 shows an example of a requirements deficiency determination scenario 800.

In FIG. 8, the vehicle 802, which is similar to vehicle 102, is travelling along a road M, and approaching an intersection X. The requirements deficiency determination system 270, or more specifically, the data acquisition module 320 may receive sensor data 350 from the sensors 222. The sensors 222 may detect the traffic sign 814 at the intersection X but may be unable to determine the message on the traffic sign 814 since the traffic sign is occluded by a tree branch 816. The sensors 222 may use any suitable image recognition algorithm, machine learning algorithm and/or artificial intelligence process to identify the tree branch occluding the traffic sign.

The requirements deficiency determination system 270, or more specifically the deficiency resolution module 330, may determine the autonomous driving requirements (based on a level of autonomous operation) for the road and intersection. The autonomous driving requirements may include having a stop sign at the intersection. The deficiency resolution module 330 may identify the deficiency in the autonomous driving requirements by comparing the sensor data 350 to the autonomous driving requirements data 360. In this case, the sensor data 350 may indicate that the message on the traffic sign 814 is not visible because of the tree branch 816. As such, the deficiency resolution module 330 may determine that the tree branch 816 should be cut back and may further include how much of the tree branch to cut.

Similar to FIG. 6, the deficiency resolution module may update an autonomous driving readiness map with the determined alterations. The deficiency resolution module may transmit the alterations to other entities such as a database 804, a second vehicle 802B, an insurance entity 806, a vehicle manufacturer 808, and/or a road development entity 810. As previously mentioned, the alterations may be transmitted in any suitable form such as an image and/or as text.

It will be appreciated that arrangements described herein can provide numerous benefits, including one or more of the benefits mentioned herein. For example, arrangements described herein can result in reduced stalling or halting of transmissions between server(s) and member vehicles of a vehicular micro cloud. Arrangements described herein may result in reduced server intelligence and multicast complexity.

FIG. 2 will now be discussed in full detail as an example environment within which the system and methods disclosed herein may operate. In some instances, the vehicle 102 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 102 can be a conventional vehicle that is configured to operate in only a manual mode.

In one or more embodiments, the vehicle 102 is an autonomous vehicle. As used herein, "autonomous vehicle" refers to a vehicle that operates in an autonomous mode. "Autonomous mode" refers to navigating and/or maneuvering the vehicle 102 along a travel route using one or more computing systems to control the vehicle 102 with minimal or no input from a human driver. In one or more embodiments, the vehicle 102 is highly automated or completely automated. In one embodiment, the vehicle 102 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 102 along a travel route.

The vehicle 102 can include one or more processors 210. In one or more arrangements, the processor(s) 210 can be a main processor of the vehicle 102. For instance, the processor(s) 210 can be an electronic control unit (ECU). The vehicle 102 can include one or more data stores 215 for storing one or more types of data. The data store 215 can include volatile and/or non-volatile memory. Examples of suitable data stores 215 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 215 can be a component of the processor(s) 210, or the data store 215 can be operatively connected to the processor(s) 210 for use thereby. The term "operatively connected," as used throughout this description, can include direct or indirect connections, including connections without direct physical contact.

In one or more arrangements, the one or more data stores 215 can include map data 216. The map data 216 can include maps of one or more geographic areas. In some instances, the map data 216 can include information or data on roads, traffic control devices, road markings, structures, features, and/or landmarks in the one or more geographic areas. The map data 216 can be in any suitable form. In some instances, the map data 216 can include aerial views of an area. In some instances, the map data 216 can include ground views of an area, including 360-degree ground views. The map data 216 can include measurements, dimensions, distances, and/or information for one or more items included in the map data 216 and/or relative to other items included in the map data 216. The map data 216 can include a digital map with information about road geometry. The map data 216 can be high quality and/or highly detailed.

In one or more arrangements, the map data 216 can include one or more terrain maps 217. The terrain map(s) 217 can include information about the ground, terrain, roads, surfaces, and/or other features of one or more geographic areas. The terrain map(s) 217 can include elevation data in the one or more geographic areas. The map data 216 can be high quality and/or highly detailed. The terrain map(s) 217 can define one or more ground surfaces, which can include paved roads, unpaved roads, land, and other things that define a ground surface.

In one or more arrangements, the map data 216 can include one or more static obstacle maps 218. The static obstacle map(s) 218 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 218 can have location data, size data, dimension data, material data, and/or other data associated with it. The static obstacle map(s) 218 can include measurements, dimensions, distances, and/or information for one or more static obstacles.

The static obstacle map(s) 218 can be high quality and/or highly detailed. The static obstacle map(s) 218 can be updated to reflect changes within a mapped area.

The one or more data stores 215 can include sensor data 219. In this context, "sensor data" means any information about the sensors that the vehicle 102 is equipped with, including the capabilities and other information about such sensors. As will be explained below, the vehicle 102 can include the sensor system 220. The sensor data 219 can relate to one or more sensors of the sensor system 220. As an example, in one or more arrangements, the sensor data 219 can include information on one or more LIDAR sensors 224 of the sensor system 220.

In some instances, at least a portion of the map data 216 and/or the sensor data 219 can be located in one or more data stores 215 located onboard the vehicle 102. Alternatively, or in addition, at least a portion of the map data 216 and/or the sensor data 219 can be located in one or more data stores 215 that are located remotely from the vehicle 102.

As noted above, the vehicle 102 can include the sensor system 220. The sensor system 220 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 220 includes a plurality of sensors, the sensors can work independently from each other. Alternatively, two or more of the sensors can work in combination with each other. In such a case, the two or more sensors can form a sensor network. The sensor system 220 and/or the one or more sensors can be operatively connected to the processor(s) 210, the data store(s) 215, and/or another element of the vehicle 102 (including any of the elements shown in FIG. 2). The sensor system 220 can acquire data of at least a portion of the external environment of the vehicle 102 (e.g., nearby vehicles).

The sensor system 220 can include any suitable type of sensor. Various examples of different types of sensors will be described herein. However, it will be understood that the embodiments are not limited to the particular sensors described. The sensor system 220 can include one or more vehicle sensors 221. The vehicle sensor(s) 221 can detect, determine, and/or sense information about the vehicle 102 itself. In one or more arrangements, the vehicle sensor(s) 221 can be configured to detect, and/or sense position and orientation changes of the vehicle 102, such as, for example, based on inertial acceleration. In one or more arrangements, the vehicle sensor(s) 221 can include one or more accelerometers, one or more gyroscopes, an inertial measurement unit (IMU), a dead-reckoning system, a global navigation satellite system (GNSS), a global positioning system (GPS), a navigation system 247, and/or other suitable sensors. The vehicle sensor(s) 221 can be configured to detect, and/or sense one or more characteristics of the vehicle 102. In one or more arrangements, the vehicle sensor(s) 221 can include a speedometer to determine a current speed of the vehicle 102.

Alternatively, or in addition, the sensor system 220 can include one or more environment sensors 222 configured to acquire, and/or sense driving environment data. "Driving environment data" includes data or information about the external environment in which the vehicle is located or one or more portions thereof. For example, the one or more environment sensors 222 can be configured to detect, quantify and/or sense obstacles in at least a portion of the external environment of the vehicle 102 and/or information/data about such obstacles. Such obstacles may be stationary objects and/or dynamic objects. The one or more environment sensors 222 can be configured to detect, measure, quantify and/or sense other objects in the external environment of the vehicle 102, such as, for example, lane markers, signs, traffic lights, traffic signs, lane lines, crosswalks, curbs proximate the vehicle 102, off-road objects, electronic roadside devices, etc. The one or more environment sensors 222 can be configured to determine whether the objects with electronic capability are functional by wirelessly transmitting messages to and receiving messages from the objects.

Various examples of sensors of the sensor system 220 will be described herein. The example sensors may be part of the one or more environment sensors 222 and/or the one or more vehicle sensors 221. However, it will be understood that the embodiments are not limited to the particular sensors described.

As an example, in one or more arrangements, the sensor system 220 can include one or more radar sensors 223, one or more LIDAR sensors 224, one or more sonar sensors 225, one or more cameras 226, and/or one or more communication sensors 227. In one or more arrangements, the one or more cameras 226 can be high dynamic range (HDR) cameras or infrared (IR) cameras. The communication sensor(s) 227 such as radio frequency identification (RFID) and near-field communication (NFC) readers may communicate with electronic objects such as RFID and/or NFC tags in the environment using any suitable means of communication such as Wi-Fi, Bluetooth, vehicle-to-infrastructure (V2I) wireless communication, vehicle-to-everything (V2X) wireless communication, RFIC, and NFC.

The vehicle 102 can include an input system 230. An "input system" includes any device, component, system, element or arrangement or groups thereof that enable information/data to be entered into a machine. The input system 230 can receive an input from a vehicle passenger (e.g., a driver or a passenger). The vehicle 102 can include an output system 235. An "output system" includes any device, component, or arrangement or groups thereof that enable information/data to be presented to a vehicle passenger (e.g., a person, a vehicle passenger, etc.).

The vehicle 102 can include one or more vehicle systems 240. Various examples of the one or more vehicle systems 240 are shown in FIG. 2. However, the vehicle 102 can include more, fewer, or different vehicle systems. It should be appreciated that although particular vehicle systems are separately defined, each or any of the systems or portions thereof may be otherwise combined or segregated via hardware and/or software within the vehicle 102. The vehicle 102 can include a propulsion system 241, a braking system 242, a steering system 243, throttle system 244, a transmission system 245, a signaling system 246, and/or a navigation system 247. Each of these systems can include one or more devices, components, and/or a combination thereof, now known or later developed.

The navigation system 247 can include one or more devices, applications, and/or combinations thereof, now known or later developed, configured to determine the geographic location of the vehicle 102 and/or to determine a travel route for the vehicle 102. The navigation system 247 can include one or more mapping applications to determine a travel route for the vehicle 102. The navigation system 247 can include a global positioning system, a local positioning system or a geolocation system.

The processor(s) 210, the requirements deficiency determination system 270, and/or the autonomous driving module(s) 260 can be operatively connected to communicate with the various vehicle systems 240 and/or individual components thereof. For example, returning to FIG. 2, the processor(s) 210 and/or the autonomous driving module(s) 260 can be in communication to send and/or receive information from the various vehicle systems 240 to control the movement, speed, maneuvering, heading, direction, etc. of the vehicle 102. The processor(s) 210, the requirements deficiency determination system 270, and/or the autonomous driving module(s) 260 may control some or all of these vehicle systems 240 and, thus, may be partially or fully autonomous.

The processor(s) 210, the requirements deficiency determination system 270, and/or the autonomous driving module(s) 260 can be operatively connected to communicate with the various vehicle systems 240 and/or individual components thereof. For example, returning to FIG. 2, the processor(s) 210, the requirements deficiency determination system 270, and/or the autonomous driving module(s) 260 can be in communication to send and/or receive information from the various vehicle systems 240 to control the movement, speed, maneuvering, heading, direction, etc. of the vehicle 102. The processor(s) 210, the requirements deficiency determination system 270, and/or the autonomous driving module(s) 260 may control some or all of these vehicle systems 240.

The processor(s) 210, the requirements deficiency determination system 270, and/or the autonomous driving module(s) 260 may be operable to control the navigation and/or maneuvering of the vehicle 102 by controlling one or more of the vehicle systems 240 and/or components thereof. For instance, when operating in an autonomous mode, the processor(s) 210, the requirements deficiency determination system 270, and/or the autonomous driving module(s) 260 can control the direction and/or speed of the vehicle 102. The processor(s) 210, the requirements deficiency determination system 270, and/or the autonomous driving module(s) 260 can cause the vehicle 102 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 102 can include one or more actuators 250. The actuators 250 can be any element or combination of elements operable to modify, adjust and/or alter one or more of the vehicle systems 240 or components thereof to responsive to receiving signals or other inputs from the processor(s) 210 and/or the autonomous driving module(s) 260. Any suitable actuator can be used. For instance, the one or more actuators 250 can include motors, pneumatic actuators, hydraulic pistons, relays, solenoids, and/or piezoelectric actuators, just to name a few possibilities.

The vehicle 102 can include one or more modules, at least some of which are described herein. The modules can be implemented as computer-readable program code that, when executed by a processor 210, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively, or in addition, one or more data store 215 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 102 can include one or more autonomous driving modules 260. The autonomous driving module(s) 260 can be configured to receive data from the sensor system 220 and/or any other type of system capable of capturing information relating to the vehicle 102 and/or the external environment of the vehicle 102. In one or more arrangements, the autonomous driving module(s) 260 can use such data to generate one or more driving scene models. The autonomous driving module(s) 260 can determine position and velocity of the vehicle 102. The autonomous driving module(s) 260 can determine the location of obstacles, obstacles, or other environmental features including traffic signs, trees, shrubs, neighboring vehicles, pedestrians, etc.

The autonomous driving module(s) 260 can be configured to receive, and/or determine location information for obstacles within the external environment of the vehicle 102 for use by the processor(s) 210, and/or one or more of the modules described herein to estimate position and orientation of the vehicle 102, vehicle position in global coordinates based on signals from a plurality of satellites, or any other data and/or signals that could be used to determine the current state of the vehicle 102 or determine the position of the vehicle 102 with respect to its environment for use in either creating a map or determining the position of the vehicle 102 in respect to map data.

The autonomous driving module(s) 260 either independently or in combination with the requirements deficiency determination system 270 can be configured to determine travel path(s), current autonomous driving maneuvers for the vehicle 102, future autonomous driving maneuvers and/or modifications to current autonomous driving maneuvers based on data acquired by the sensor system 220, driving scene models, and/or data from any other suitable source such as determinations from the sensor data 219. "Driving maneuver" means one or more actions that affect the movement of a vehicle. Examples of driving maneuvers include: accelerating, decelerating, braking, turning, moving in a lateral direction of the vehicle 102, changing travel lanes, merging into a travel lane, and/or reversing, just to name a few possibilities. The autonomous driving module(s) 260 can be configured to implement determined driving maneuvers. The autonomous driving module(s) 260 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 260 can be configured to execute various vehicle functions and/or to transmit data to, receive data from, interact with, and/or control the vehicle 102 or one or more systems thereof (e.g., one or more of vehicle systems 240).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8 but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for resolving one or more deficiencies in autonomous driving requirements for a road segment, the system comprising:
one or more processors; and
a memory in communication with the one or more processors, the memory including:
a data acquisition module including instructions that when executed by the one or more processors cause the one or more processors to receive sensor data for a portion of the road segment from at least one sensor of a vehicle; and a deficiency resolution module including instructions that when executed by the one or more processors cause the one or more processors to:
  determine autonomous driving requirements for the portion of the road segment based on a level of autonomous operation, the autonomous driving requirements:
    including characteristics of the portion of the road segment that make the portion of the road segment suitable for each level of autonomous operation;
    including an installable object on the portion of the road segment, the installable object providing information to a vehicle device that is required for autonomous operation; and
    varying based on the level of autonomous operation;
  identify the one or more deficiencies in the autonomous driving requirements for the portion of the road segment based on the received sensor data and the determined autonomous driving requirements for the portion of the road segment;
  determine an alteration to said characteristics of the portion of the road segment to overcome the one or more deficiencies in the autonomous driving requirements for the portion of the road segment; and
  update an autonomous driving readiness map based on the alteration, the autonomous driving readiness map being indicative of road suitability for autonomous operation.

2. The system of claim 1, wherein the deficiency resolution module further includes instructions that when executed by the one or more processors cause the one or more processors to send the alteration to an entity, wherein the entity is one or more of a database server, a second vehicle, an insurance entity, a vehicle manufacturer, and a road development entity.

3. The system of claim 1, wherein the data acquisition module further includes instructions that when executed by the one or more processors cause the one or more processors to receive additional sensor data for the portion of the road segment from one or more external sources.

4. The system of claim 1, wherein the one or more deficiencies include at least one of missing roadside components and occluded roadside components.

5. The system of claim 1, wherein the deficiency resolution module further includes instructions that when executed by the one or more processors cause the one or more processors to determine an alteration to one or more characteristics of the vehicle to overcome the one or more deficiencies in the autonomous driving requirements for the portion of the road segment.

6. The system of claim 1, wherein the autonomous driving requirements are based on at least one of a weather condition, a road condition, a location along the road segment, and a timestamp.

7. A method comprising:
  receiving sensor data for a portion of a road segment from a vehicle sensor;
  determining autonomous driving requirements for the portion of the road segment based on a level of autonomous operation, the autonomous driving requirements:
    including characteristics of the portion of the road segment that make the portion of the road segment suitable for each level of autonomous operation;
    including an installable object on the portion of the road segment, the installable object providing information to a vehicle device that is required for autonomous operation; and
    varying based on the level of autonomous operation;
  identifying one or more deficiencies in said requirements for the portion of the road segment based on the sensor data and said requirements for the portion of the road segment;
  determining an alteration to said characteristics of the portion of the road segment to overcome the one or more deficiencies in said requirements for the portion of the road segment; and
  updating an autonomous driving readiness map based on the alteration, the autonomous driving readiness map being indicative of road suitability for autonomous operation.

8. The method of claim 7, further comprising:
  sending the alteration to an entity, wherein the entity is one or more of a database server, a vehicle, an insurance entity, a vehicle manufacturer, and a road development entity.

9. The method of claim 7, further comprising:
  receiving additional sensor data for the portion of the road segment from one or more external sources.

10. The method of claim 7, wherein the one or more deficiencies include at least one of missing roadside components and occluded roadside components.

11. The method of claim 7, further comprising:
  determining an alteration to one or more characteristics of a vehicle to overcome the one or more deficiencies in said requirements for the portion of the road segment.

12. The method of claim 7, wherein said requirements are based on at least one of a weather condition, a road condition, a location along the road segment, and a timestamp.

13. A non-transitory computer-readable medium for resolving one or more deficiencies in autonomous driving requirements for a road segment and including instructions that when executed by one or more processors cause the one or more processors to:
  receive sensor data for a portion of the road segment from at least one sensor of a vehicle;
  determine autonomous driving requirements for the portion of the road segment based on a level of autonomous operation, the autonomous driving requirements:
    including characteristics of the portion of the road segment that make the portion of the road segment suitable for each level of autonomous operation;
    including an installable object on the portion of the road segment, the installable object providing information to a vehicle device that is required for autonomous operation; and
    varying based on the level of autonomous operation;
  identify the one or more deficiencies in the autonomous driving requirements for the portion of the road segment based on the received sensor data and the determined autonomous driving requirements for the portion of the road segment; determine an alteration to said characteristics of the portion of the road segment to overcome the one or more deficiencies in the autonomous driving requirements for the portion of the road segment; and
  update an autonomous driving readiness map based on the alteration, the autonomous driving readiness map being indicative of road suitability for autonomous operation.

14. The non-transitory computer-readable medium of claim 13, wherein the instructions further include instructions that when executed by the one or more processors cause the one or more processors to send the alteration to an entity, wherein the entity is one or more of a database server, a second vehicle, an insurance entity, a vehicle manufacturer, and a road development entity.

15. The non-transitory computer-readable medium of claim 13, wherein the instructions further include instructions that when executed by the one or more processors cause the one or more processors to receive additional sensor data for the portion of the road segment from one or more external sources.

16. The non-transitory computer-readable medium of claim 13, wherein the one or more deficiencies include at least one of missing roadside components and occluded roadside components.

17. The non-transitory computer-readable medium of claim 13, wherein the instructions further include instructions that when executed by the one or more processors cause the one or more processors to determine an alteration to one or more characteristics of the vehicle to overcome the one or more deficiencies in the autonomous driving requirements for the portion of the road segment.

\* \* \* \* \*